United States Patent Office 2,820,064
Patented Jan. 14, 1958

2,820,064

AUTOXIDATION OF HYDROCARBONS

Joseph L. Greene, Jr., and Hugh J. Hagemeyer, Jr., Kingsport, Tenn., assignors to Eastman Kodak Company, Rochester, N. Y., a corporation of New Jersey No Drawing. Application June 24, 1953
Serial No. 363,938

5 Claims. (Cl. 260—610)

This invention is concerned with an improved method of autoxidation of hydrocarbons of the types

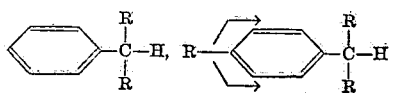

or

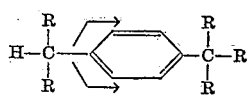

wherein R is a low molecular weight alkyl radical such as methyl or ethyl and wherein the radicals (R) may be the same or different, the curved arrows indicating that substitution may be ortho, meta or para. It is particularly concerned with the autoxidation of these hydrocarbons carried out in inert organic diluents in such a fashion that the chief products are hydroperoxides of the types

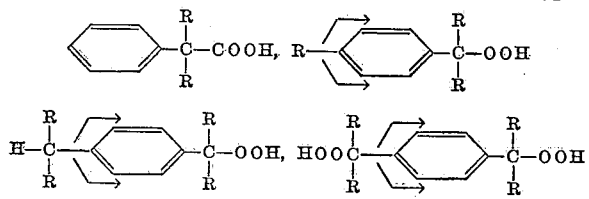

obtained in substantially higher yields than can be obtained by prior art procedures. These hydroperoxides have been isolated and purified; said hydroperoxides are excellent polymerization catalysts. They are also quite useful as intermediates in the synthesis of alcohols, ketones, and hydroxy substituted aromatics.

The autoxidation of hydrocarbons is not new to the art. For example, Stephens (J. Amer. Chem. Soc., 48, 2920 (1926)) subjected cumene and p-cymene to autoxidation conditions to obtain acetophenone and p-methylacetophenone. He apparently did not isolate or recognize the presence of the hydroperoxides which must have been present as intermediate products. Hoch and Lang (Ber. 77B, 257 (1944)) prepared, isolated, and characterized cumene hydroperoxide (α,α-dimethylbenzylhydroperoxide) by the autoxidation of cumene with dry oxygen. Lorand and Reese, U. S. Patent 2,548,435, subjected several hydrocarbons (cumene, p-cymene, diisopropylbenzene, etc.) to autoxidation conditions and thereby obtained the corresponding hydroperoxides and dihydroperoxides. Their procedure incorporates the hydrocarbon in an alkaline aqueous emulsion where it is treated with an oxygen-containing gas such as air. By such a procedure they reported obtaining 12.4% (molar) α,α,α',α'-tetramethyl-p-xylylene dihydroperoxide.

Hawkins, Quin, and Salt (British Patent 646,102) reported producing this α,α,α',α'-tetramethyl-p-xylylene dihydroperoxide in 10–15% molar yield by treating pure p-diisopropylbenzene (stabilized with a trace of sodium hydroxide) with air under essentially anhydrous conditions.

We have found that if a hydrocarbon such as p-diisopropyl-benzene or p-di-sec-butyl-benzene is diluted with a relatively high boiling inert organic liquid such as the halogenated benzenes or tert-butylbenzene and stabilized with trace amounts of a base such as sodium hydroxide and then treated with air at 75–160° C. under essentially anhydrous conditions, conversions of 30–50% to the corresponding dihydroperoxides are obtained. The reaction rate is essentially the same as that obtained when the pure hydrocarbon is autoxidized and much greater than that when the autoxidation is carried out in aqueous emulsion. One of the better diluents in tert-butylbenzene which has a desirably high boiling point and is therefore not lost in undue quantities during the reaction. o-Dichlorobenzene is practically as good but does not give a product which is as clean as tert-butylbenzene.

By use of diluents according to the invention, dihydroperoxides of compounds such as p-diisopropylbenzene and p-di-sec-butylbenzene are produced in yields substantially greater than yields of these substances obtained by following prior art procedures, and the conversion by autoxidation of the type of hydrocarbons previously described are roughly doubled.

The autoxidation of hydrocarbons is known to proceed by a free radical chain reaction. The reaction is initiated (Frank, Chem. Reviews, 46, 155 (1950)) by the formation of a free radical:

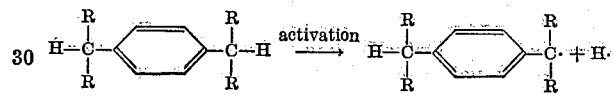

The alkyl groups (R) may be the same or different; the activation may be accomplished by heat, light, ions, or other free radicals.

The reaction is thought to be propagated as follows:

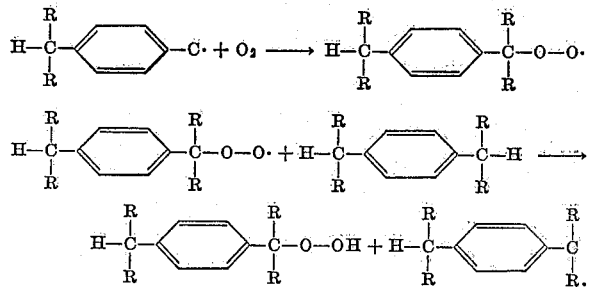

The remaining tert-carbon atom may then be activated and reacted with a molecule of oxygen and hydrocarbon to form a dihydroperoxide.

The chain reaction does not go to completion because the competitive reactions which take place serve to terminate the chain sequence; for example, the following probably occur:

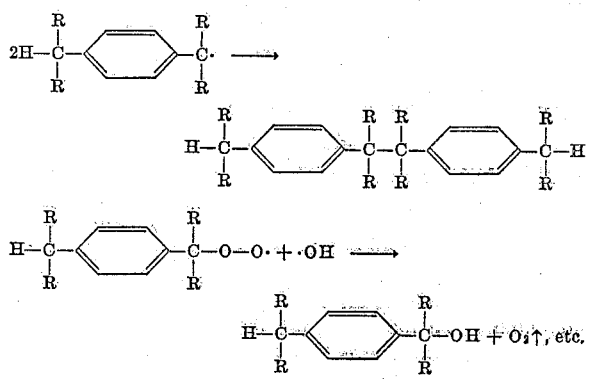

The presence of the organic diluent according to our invention seems to be beneficial in that it suppresses the chain terminating reactions without inhibiting the activation of propagation of the reaction. It is not believed that the diluent acts as a free radical chain carrier in that tert-butylbenzene serves as well as do the halogenated benzenes. The presence of the inert diluent is necessary to obtain the conversions reported herein.

The practice of the invention is best illustrated by specific examples.

*Example 1*

Diisopropylbenzene (96% para; 45 g.), bromobenzene (55 g.), sodium hydroxide (1 drop of 50% aqueous solution), and α,α'-dihydroperoxy-p-diisopropylbenzene (0.5 g.) are placed in a glass column fitted with a sintered glass gas dispersion plate, a thermometer well, an external heating element, and an efficient condensing system. The mixture is heated to 110° C. and maintained at this temperature ±3° C. for eleven hours while air is passed through the mixture in a fine dispersion at 30 l. per hour. At the end of this time the solid α,α'-dihydroperoxy-p-diisopropylbenzene crystallizes from the solution as it cools. Conversion: 32%. The monohydroperoxide remains in solution and may be isolated by known procedures. Conversion: 30%.

*Example 2*

Diisopropylbenzene (90% para; 150 g.), tert-butylbenzene (75 g.), sodium hydroxide (2 drops of a 50% aqueous solution), and α,α'-dihydroperoxy-p-diisopropylbenzene are placed in an apparatus such as that described in Example 1. The system is heated to 125° C. and finely dispersed air is passed through it at that temperature at the rate of 120 liters per hour for six hours. At the end of 2.5 hours a second portion of tert-butylbenzene (75 g.) is added to the reaction mixture. At the end of the reaction there are recovered α,α'-dihydroperoxy-p-diisopropylbenzene (66 g.; 35% conversion) and α-hydroperoxy-p-diisopropylbenzene (67 g.; 41.5% conversion).

*Example 3*

Diisopropylbenzene (98% para; 50 g.), tert-butylbenzene (30 g.), sodium hydroxide (1 drop of 50% aqueous solution), and α,α'-dihydroperoxy-p-diisopropylbenzene (0.5 g.) are placed in the apparatus described in Example 1. The system is heated to 125° C. and finely dispersed air is passed through the mixture at the rate of 42 l. per hour for eleven hours. A second portion of tert-butylbenzene (30 g.) is added to the system at the end of five hours. The conversions are: α,α'-dihydroperoxy-p-diisopropylbenzene (30.5 g.; 44.5%) and α-hydroperoxy-p-diisopropylbenzene (22.4 g.; 38.2%).

*Example 4*

Diisopropyl benzene (93% para; 45 g.), o-dichlorobenzene (55 g.), sodium hydroxide solution (3 drops of 50% aqueous solution) and α,α'-dihydroperoxy-p-diisopropylbenzene (0.45 g.) are placed in the apparatus described in Example 1. The system is heated to 125±5° C. and finely dispersed air is passed through the mixture at the rate of 42 l. per hour for 10 hours. A second portion of o-dichlorobenzene (30 g.) is added to the system at the end of 5 hours. The conversions are α,α'-dihydroperoxy-p-diisopropylbenzene (20.1 g.; 32%) and α-hydroperoxy-p-diisopropylbenzene (15.6 g.; 29%).

*Example 5*

Di-sec-butylbenzene (85% para; 150 g.), bromobenzene (150 g.), α,α'-dihydroperoxy-p-diisopropylbenzene (1.5 g.), and sodium hydroxide (3 drops of a 50% aqueous solution) are placed in the apparatus described in Example 1. The system is heated to 120° and treated with finely dispersed air flowing at 100 l. per hour for nine hours. At the end of this time the reaction mixture is allowed to cool and is then transferred to a separatory funnel where it is extracted with three 80-ml. portions of 10% sodium hydroxide in water. The basic extract is treated with solid carbon dioxide to a pH of 7.5 at which point a white oil separates. This oil is separated and the aqueous layer is extracted with two 50-ml. portions of petroleum ether; the oil and ether extracts are combined and dried over anhydrous calcium sulfate before the petroleum ether is removed under vacuum. The clear viscous liquid which remains is essentially pure α-hydroperoxy-p-di-sec-butylbenzene.

*Analysis.*—calcd. for $C_{14}H_{22}O_{2}$: peroxygen, 7.18%. Found: peroxygen, 6.98%.

The organic layer from the alkali extraction is treated with a 30% excess of 50% aqueous sodium hydroxide with vigorous stirring; the gelatinous suspension which forms is poured into a large excess of diethyl ether where a fine white solid separates. This solid is washed twice with ether by decantation, collected on a filter, and dried in vacuo. Suspension of this dried solid in water and neutralization with solid $CO_2$ yields a viscous oil which crystallizes upon standing. The crude solid is taken up in n-butyl ether and petrolum ether is added until a permanent cloudiness is obtained; heating on a steam bath gives a clear homogeneous solution which is allowed to stand several days at 5° C. Small, hard, white crystals of α,α'-dihydroperoxy-p-di-sec-butylbenzene are thus obtained; M. P. 84–85° C.

*Analysis:*—Calcd. for $C_{14}H_{22}O_{4}$: peroxygen, 12.58%. Found: peroxygen, 12.50%.

We have also found that if a hydrocarbon such as p-diisopropylbenzene or p-di-sec-butylbenzene is diluted with an inert organic liquid such as the halogenated benzenes or tert-butylbenzene, this solution incorporated in a mildy alkaline aqueous emulsion and treated with air at 30°–100° C. (preferably at 75° C. to 90° C.), conversions of 70% to the dihydroperoxide are easily obtainable. Higher conversions can be obtained with the emulsions than with use of anhydrous diluents, but the reaction times are longer when the diluent-water emulsions are used.

This phase of the invention is illustrated by the following examples.

*Example 6*

Diisopropylbenzene (88% para; 100 g.), tert-butylbenzene (100 g.), 2% sodium carbonate solution in water (200 g.), and sodium stearate (0.2 g.) are placed in a glass column fitted with a sintered glass gas dispersion plate, a thermometer well, an external heating element, and an efficient condensing system. The mixture is heated to 85° C.±5° C. and maintained at this temperature while finely dispersed air is passed through the mixture for 90 hours. The mixture is then allowed to cool; α,α'-dihydroperoxy-p-diisopropylbenzene crystallizes from the cool mixture and is filtered off. Conversion: 55 g. or 45%. The organic layer of the filtrate contains 38 g. or a 36% conversion to α-hydroperoxy-p-diisopropylbenzene.

*Example 7*

Diisopropylbenzene (88% para; 100 g.), chlorobenzene (100 g.), 2% sodium carbonate solution in water (200 g.) sodium stearate (0.2 g.) and α,α'-dihydroperoxy-p-diisopropylbenzene (1.0 g.) are placed in the apparatus described in Example 1 and are treated with finely dispersed air at 85±5° C. for 160 hours. At the end of 50 hours more chlorobenzene (50 g.) and 2% sodium carbonate solution (100 g.) are added to the system. At the end of the reaction the mixture is removed from the column and allowed to cool. The solid dihydroperoxide which crystallizes from the mixture is collected on a filter and dried. Conversion: 82 g.; 68%. The filtrate contains 8.5 g. or an 8% conversion to α-hydroperoxy-p-diisopropylbenzene.

*Example 8*

Diisopropylbenzene (88% para; 100 g.), o-dichlorobenzene (100 g.), 2% sodium carbonate solution in water (200 g.), sodium stearate (0.2 g.) and α,α'-dihydroperoxy-p-diisopropylbenzene (1.0 g.) are placed in the apparatus described in Example 1 and are treated with finely dispersed air at 85±5° C. for 160 hours. At the end of 50 hours more o-dichlorobenzene (50 g.) and 2% sodium carbonate solution (100 g.) are added to the system. At the end of the reaction the mixture is removed from the column and allowed to cool. The solid dihydroperoxide which crystallizes from the mixture is collected on a filter and dried. Conversion: 78 g. or 65%. The filtrate contains 8.5 g. or 8% conversion to α-hydroperoxy-p-diisopropylbenzene.

*Example 9*

Diisopropylbenzene (98% para; 100 g.), tert-butylbenzene (100 g.), 2% sodium carbonate solution in water (200 g.), α,α-dihydroperoxy-p-diisopropylbenzene (1.0 g.), and sodium stearate (0.2 g.) are placed in the apparatus described in Example 1, heated to 85±5° C., and treated with finely dispersed air for 160 hours. After 72 hours second portions of tert-butylbenzene (50 g.) and sodium carbonate solution (100 g.) are added. At the end of 120 hours still more tert-butylbenzene (50 g.) and sodium carbonate solution are added. At the end of the reaction the mixture is removed from the column and allowed to cool. α,α'-Dihydroperoxy-p-diisopropylbenzene (95 g.; 70% conversion) is removed from the cooled reaction mixture by filtration. The filtrate contains 5 g. or 4.3% conversion to α-hydroperoxy-p-diisopropylbenzene.

The hydroperoxy disecondary butyl benzene compounds isolated and claimed herein are surprisingly much more useful than the isopropyl compounds, as the disec-butyl compounds have been found to have lower decomposition temperatures. This lower decomposition temperature becomes important in those vinyl polymerizations wherein the polymerization must be carried out at lower temperatures so as to avoid excessive chain branching.

We claim:
1. A process for the autoxidation of liquid hydrocarbons of the types

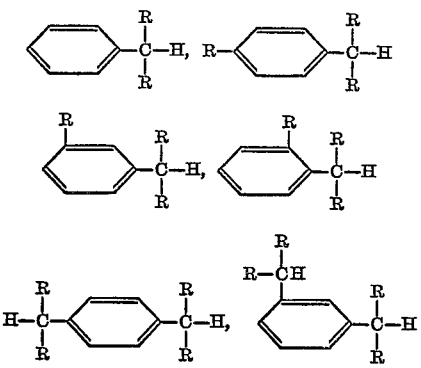

and

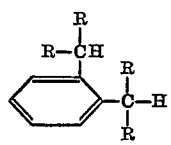

wherein R is a low-molecular weight alkyl radical selected from methyl and ethyl and wherein the radicals (R) may be the same or different, to hydroperoxide of the types

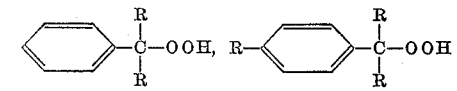

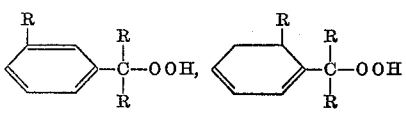

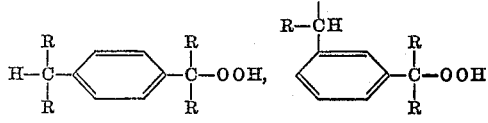

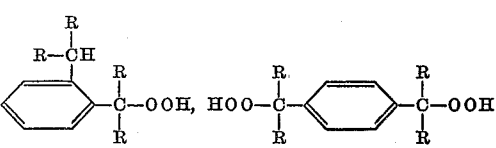

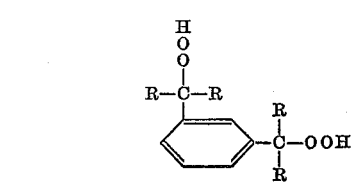

and

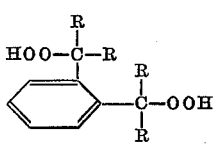

comprising diluting the hydrocarbon with an inert organic diluent from the class consisting of tertiary butylbenzene and the halogenated benzenes and having boiling point above about 132° C. at 1 atm., passing in an oxygen-containing gas in intimate contact therewith at a temperature of between about 75° C.–160° C., and maintaining the temperature of the reaction below the boiling point of the inert organic diluent.

2. A process according to claim 1 wherein the process is carried out under substantially anhydrous conditions.

3. A process according to claim 1 wherein the diluent is in a water emulsion.

4. A process according to claim 1 wherein the diluent constitutes from 5 to 95% of the reaction mixture.

5. As a new product, α,α'-dihydroperoxy-p-di-sec-butylbenzene.

References Cited in the file of this patent
UNITED STATES PATENTS

| | | |
|---|---|---|
| 2,547,938 | Hall et al. | Apr. 10, 1951 |
| 2,548,435 | Lorand et al. | Apr. 10, 1951 |
| 2,715,646 | Hawkins et al. | Aug. 16, 1955 |
| 2,748,172 | Rogers | May 29, 1956 |

FOREIGN PATENTS

| | | |
|---|---|---|
| 498,029 | Belgium | Sept. 30, 1950 |

(Corresponding British 646,102, Nov. 15, 1950)

| | | |
|---|---|---|
| 968,209 | France | Nov. 22, 1950 |

(Corresponding Canada 485,435, Aug. 5, 1952)

| | | |
|---|---|---|
| 979,665 | France | Dec. 13, 1950 |

(Corresponding British 676,770, Aug. 6, 1952)

UNITED STATES PATENT OFFICE
Certificate of Correction

Patent No. 2,820,064　　　　　　　　　　　　　　　　　　　　　January 14, 1958

Joseph L. Greene, Jr., et al.

It is hereby certified that error appears in the printed specification of the above numbered patent requiring correction and that the said Letters Patent should read as corrected below.

Column 1, lines 22 to 25, the chemical formula should appear as shown below instead of as in the patent—

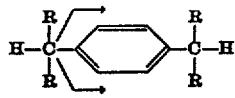

column 2, line 12, for "diluents in" read —diluents is—; lines 45 to 48, the right-hand portion of the formula should appear as shown below instead of as in the patent—

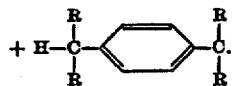

column 3, line 2, for "of", first occurrence, read —or—; column 5, line 17, for "$\alpha,\alpha$-dihydroperoxy-p-diisopropylbenzene" read —$\alpha,\alpha'$-dihydroperoxy-p-diisopropylbenzene—.

Signed and sealed this 15th day of April 1958.

[SEAL]

Attest:
KARL H. AXLINE,
Attesting Officer.

ROBERT C. WATSON,
Commissioner of Patents.